United States Patent [19]

Jacobs

[11] Patent Number: 4,647,929
[45] Date of Patent: Mar. 3, 1987

[54] NETWORK SYSTEM FOR NAVIGATION LIGHTS

[75] Inventor: Thomas A. Jacobs, Abbebile, La.

[73] Assignee: The Seanav Corporation, Lafayette, La. ; a part interest

[21] Appl. No.: 738,840

[22] Filed: May 29, 1985

[51] Int. Cl.$^4$ .................. G08G 3/00; G08B 23/00
[52] U.S. Cl. .................... 340/985; 340/332; 340/984
[58] Field of Search ............... 340/984, 985, 321, 331, 340/332, 825.14, 825.06; 250/336.1, 338, 344, 372, 201, 214 AL; 362/183

[56] References Cited

U.S. PATENT DOCUMENTS 2,674,726  4/1954  Williams .......................... 340/985
3,781,853  12/1973  Jacobs .............................. 340/985

FOREIGN PATENT DOCUMENTS 777343  11/1980  U.S.S.R. .......................... 340/985
798404  1/1981  U.S.S.R. .......................... 340/985
813490  3/1981  U.S.S.R. .......................... 340/985

Primary Examiner—John W. Caldwell, Sr.
Assistant Examiner—Tyrone Queen
Attorney, Agent, or Firm—Hubbard, Thurman, Turner & Tucker

[57] ABSTRACT

A navigation light control system that includes a network of navigation light control circuits interconnected and each control circuit further connected to operate at least one navigation light. Each control circuit includes a start circuit that provides an initiation signal upon the detection of a loss of sunlight. The initiation signal is input to a first timer that provides a begin signal after a preselected time. The begin signal is input to a second timer that provides an operation signal to a lamp driver circuit for flashing one or more of the lamps in response. The control circuit further includes a coupling circuit that couples the control circuits together in the network and receives a slave indication signal from one of the other control circuits that disables the first and second timers in response and further provides the slave indication signal to the lamp driver to flash one or more of the lamps. The coupling circuit also includes the means to transmit the operation period signal from the second timer as a slave indication signal to the network if the operation period signal from the second timer occurs before a slave indication signal from any of the other control circuits in the network is received. In a further embodiment, a code signal generation circuit is included that provides a predetermined sequence of activation signals to flash the lamps of the network in a Morse code sequence.

11 Claims, 5 Drawing Figures

NETWORK SYSTEM FOR NAVIGATION LIGHTS

BACKGROUND OF THE INVENTION

1. Field of the Invention

This invention relates to circuits that activate marine obstruction lights and more specifically to the interconnection of several control circuits for operating the marine obstruction lights.

2. Description of the Related Art

Marine obstruction lights or navigation lights are common on obstructions within navigatable waters. Examples of such structures having navigation lights include marker bouys and channel boundaries. Traditionally, an obstruction that includes several navigation lights includes a synchronous mechanism to flash the lights at the same time. An example of such a mechanism is a master/slave system wherein the master circuit contains a timer, an automatic sun switch, and a power switch that turns the master light on and all the slave lights on. In the event that the total current required by the slave lights is greater than the capacity of the power switch of the master light, a third type of light, the slave repeater is often required. The slave and slave repeater lights have no automatic sun switch or timers and only the repeater has a power switch. Failure of the master light means failure of all the lights of the navigation system.

Another example of a navigation light system includes lights with individual timers and a synchronizing signal source. In this system, the synchronizing source signal starts each of the timers which each provide the signal to activate their respective navigation lights. If an individual timer fails, the respective light will fail. Also, if the synchronization source fails, the individual timers would either fail or continue to function resulting in nonsynchronous operation because of the different individual operating characteristics of the timers.

Furthermore, in the past timers were designed to flash complex codes such as a Morse code letter. An example of such an apparatus is contained in U.S. Pat. No. 3,027,491. In this implementation each different light includes a means to independently generate dots and/or dashes of Morse code. The independent operations result in not only nonuniformity of the dots and dashes defining the code letter but also result in nonsynchronism between lights.

It is an object of the present invention to provide a network of control circuits for controlling navigation lights where each control circuit is capable of operating as a master controller in relation to all other circuits in the system.

It is a further object of the present invention to provide a network of timer circuits for controlling navigation lights wherein each timer circuit acting as a slave circuit is capable of detecting a failure of the master and of becoming the master itself.

SUMMARY OF THE INVENTION

In accordance with the present system a navigation light control system is provided that includes a network of navigation light control circuits having each interconnected to all other control circuits of the network and further each control circuit connected to operate at least one navigation lamp. Each control circuit includes a start circuit for initiating the operation of a first internal timer circuit that provides a begin signal after a predetermined time from the initiation. A second internal timer circuit connected to receive the begin signal is provided to produce an operation period signal. This operation period signal is connected as an input to a lamp driver circuit for flashing one or more lamps in response to the period signal. A coupling circuit is included connected to the control circuit and further connected to the network of control circuits. The coupling circuit receives slave indications from one of the other control circuits and disables the two interval timers in response to the received slave indication signal and further provides the slave indication signal to the lamp driver circuit as an operational signal. The coupling circuit also transmits the operation period signal from the second interval timer as a slave indication to the network if the second interval timer operation signal has occurred before the reception of a slave indication signal from any of the other control circuits connected to the network.

In an embodiment of the present invention the system is provided with a start circuit that includes a sunlight detector for determining nightfall. Also in an embodiment, the first interval timer is connected to the coupling means and will only provide a begin signal if a slave indication signal has not been received from one of the other control circuits. In this embodiment, the coupling circuit includes a jumper apparatus to enable the slave indication signal to be either a positive or a negative signal. In other words, if the slave indication signal is to be a negative signal in the network, the jumper apparatus is wired to receive a negative signal from any of the other control circuits and also to provide a negative signal as a slave indication signal if the control circuit is in master mode.

In another embodiment, the control circuit is configured with a code signal generation circuit located between the output of the second interval timer and the lamp driver circuit. In this embodiment, the code signal generation circuit provides an output to the lamp driver circuit to activate the lamp in accordance with a Morse code letter. The code signal generator includes combinational logic with a binary counter for repeatedly providing the predetermined sequence of code activation signals to the lamp. These code activation signals are also connected to the coupler and serve as the slave indication signals to the other control circuits in the network. Also in this embodiment, a terminal is provided connected to the output of the first interval timer to provide a master signal indication designating that the control circuit is in master mode.

BRIEF DESCRIPTION OF THE DRAWINGS

The novel features believed characteristic of the invention are set forth in the claims. The invention itself, however, as well as other features and advantages thereof will be best understood by reference to the detailed description that follows when read in conjunction with the accompanying drawings, wherein:

DESCRIPTION OF THE PREFERRED EMBODIMENT

The following description discusses a navigation light control circuit invention that includes individual control circuits capable of being networked such that a single control circuit will operate as a master control circuit while the remaining networked control circuits will act as slave control circuits. In operation, these control circuits become operational when a loss of sunlight (i.e. detection of darkness) has occurred. When the loss of sunlight has been detected, the first control circuit to transmit an indication signal will become the master control circuit and the remaining control circuits will become the slave control circuits. This invention further includes the capability to enable any one of the slave control circuits to become the master circuit in the event that the master control circuit fails.

Figure 1:
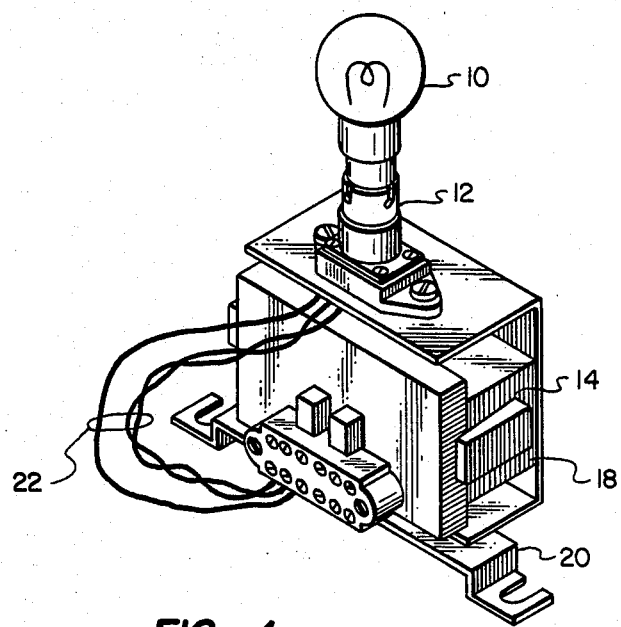
FIG. 1 is an illustration of a single navigation light control circuit with navigation lamp.

Each control circuit is capable of driving at least one navigational light. The control circuits are for installation on marine structures to provide a warning indication. By interconnecting the control circuits in the network, the operation of the navigational lights for a single marine obstruction will be in unison, therefore making it easier for one to determine whether several lights are connected to a single obstruction or several obstructions. FIG. 1 is an illustration of a single control circuit structure 14 including a navigation lamp 10 connected in socket 12 to a housing 18 that includes the control circuitry internally. The housing 18 is connected to a bracket 20 provided for mounting the navigation light apparatus upon the marine obstruction. In the preferred embodiment, the lamp 10 includes dual filaments which are driven by the control circuitry with three wires 22. Only one filament is operated at a time. Indications as to which filament is operating is provided by the LEDs 16 connected to the terminal block of the control circuit casing 18.

Figure 2:
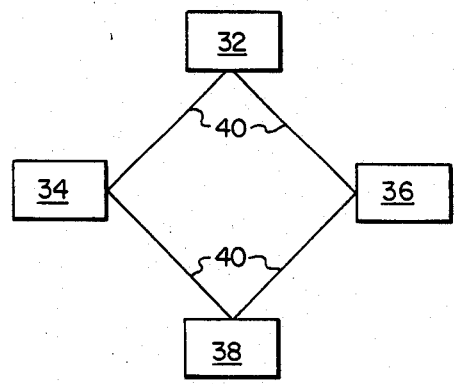
FIG. 2 is a schematic diagram illustrating the network interconnection of the navigation control circuits.

FIG. 2 is a schematic illustration of four navigation light control circuits 32, 34, 36 and 38 connected by a single line 40 which represents the slave indication line that is used to control the slave control circuits and further, the power line. For example, if control circuit 32 was the first circuit to detect nightfall, control circuit 32 would transmit a slave indication signal on line 40 to the control circuits 34, 36 and 38. Upon receiving this slave indication signal, control circuits 34, 36 and 38 would use the slave indication signal to drive their respective lamp driver circuits resulting in all four control circuits 32, 34, 36 and 38 flashing their respective lights in unison. The control circuits are configured to provide a slave indication signal if the master circuit fails. The first control circuit to provide the slave indication signal will become the new master.

Figure 3:
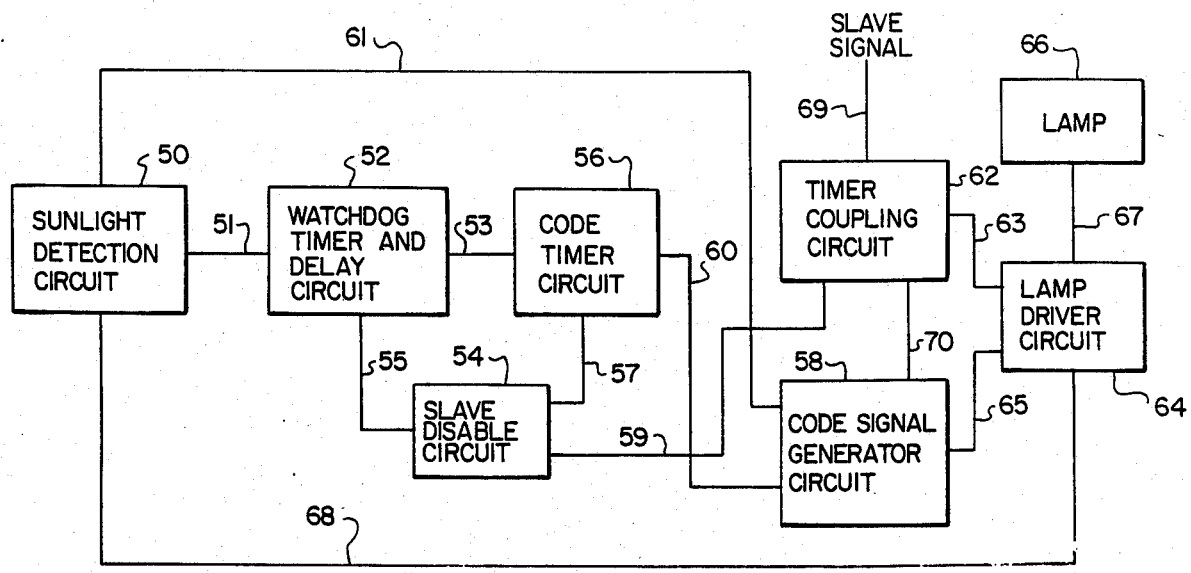
FIG. 3 is a block diagram of a single control circuit.

FIG. 3 is a block diagram of a single control circuit. For simplicity, the following explanation is for an individual control circuit operation whereby the control circuit is not networked. The sunlight detection circuit 50 is provided to detect the loss of sunlight or nightfall. Upon detecting the loss of sunlight, the sunlight detection circuit 50 provides an initiation signal on line 51 to the watchdog timer and delay circuit 52. After a predetermined delay time, the watchdog timer and delay circuit 52 provides an output, a begin signal, on line 53 to the code timer circuit 56. After a preselected time, the code timer circuit 56 provides an operation period signal on line 60 to the code signal generator circuit 58. The code signal generator circuit 58 provides a signal sequence output on line 65 to the lamp driver circuit 64 which in turn drives the lamp 66 with a voltage on line 67. The lamp driver circuit 64 is connected to the sunlight detection circuit 50 via line 68 to prevent the sunlight detection circuit from erroneously signaling the occurrence of sunlight when the lamp driver circuit 64 is driving the lamp 66. Likewise, the code signal generator circuit 58 provides an input to the sunlight detection circuit 50 via line 61 when the code timer circuit 56 is providing for the operation of the lamp 66. In the single control circuit operation, the timer coupler circuit 62 and the slave disable circuit 54 are inoperative.

In an embodiment, the code timer circuit 56 may be connected directly to the lamp driver circuit 64 if a code sequence is not required to drive the lamp 66. If the code timer circuit 56 is connected directly to the lamp driver circuit 64 then the timer output on line 60 will directly activate the lamp 66.

When the controller of FIG. 3 is connected to a network, the slave signal on line 69 is connected to the network. The circuit operates as before except that if a slave signal is received by the timer coupling circuit 62 before the code timer circuit 56 or the code signal generator circuit 58 provides the signal to the lamp driver circuit 64, the watchdog timer and delay circuit 52 is disabled by the slave disable circuit 54 on line 55. Additionally, the slave disable circuit disables the code timer circuit 56. The slave signal on line 69 to the timer coupling circuit 62 further provides a signal on line 63 to the lamp driver circuit 64 to activate the lamp 66. If the circuit in FIG. 3 is the first circuit to detect the loss of sunlight, the sunlight detection circuit 50 that provides the output on line 51 will enable the watchdog timer and delay circuit 52 as before. The code timer circuit 56 will provide the signal on line 60 to the code signal generator which beside providing the sequence signal to the lamp driver circuit 64 will provide a sequence signal to the timer coupling circuit 62 which in turn provides the slave indication signal on line 69 to the other control circuits of the network.

If the external master control circuit fails, the slave indication signal will not be received by the timer coupling circuit 62 resulting in the slave disable circuit 54 enabling the watchdog timer and delay circuit 52 and code timer circuit 56. If the control circuit is the first of the network to output a lamp activation signal from the code signal generator circuit 58, then this output will be the network slave indication signal and the control circuit will be network master. Otherwise, when a new slave indication signal is received, the control circuit will revert back to slave mode.

Figure 4:
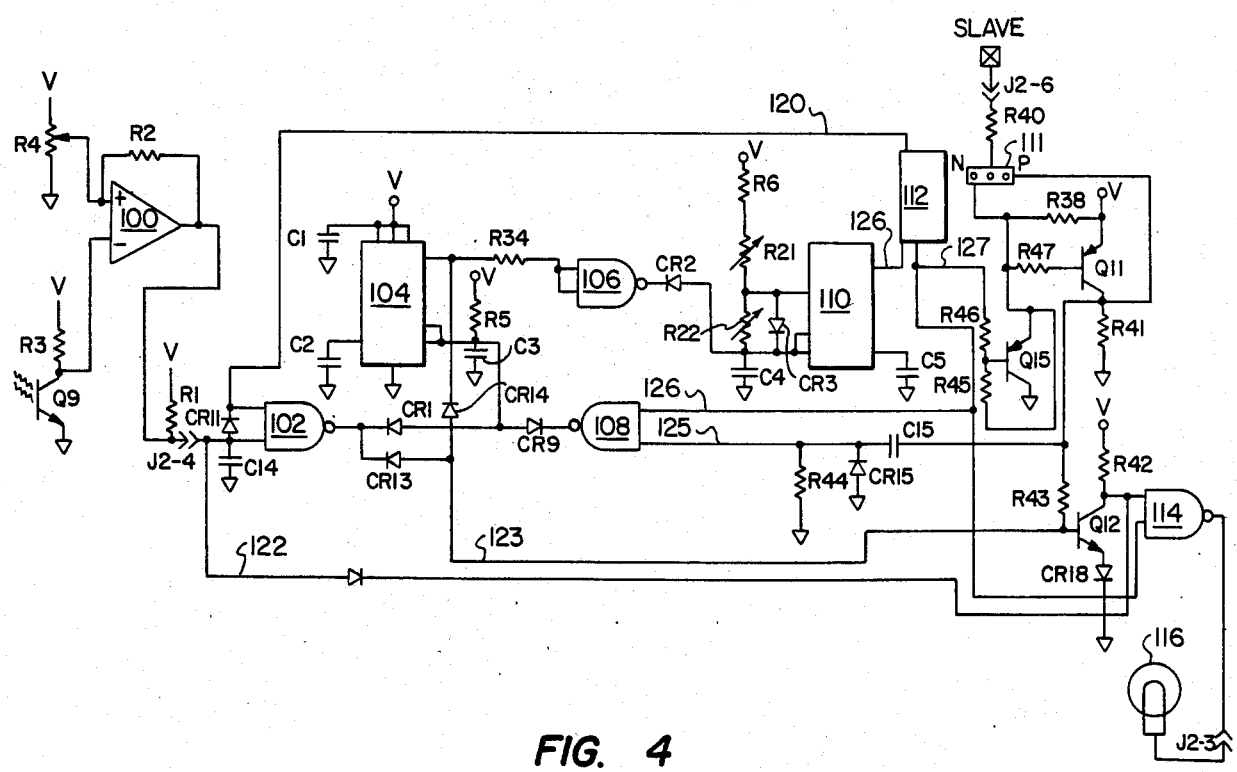
FIG. 4 is a schematic diagram of the navigation light control circuit.

FIG. 4 is a schematic diagram of the controller illustrated in FIG. 3. Referring to FIG. 4, resistor R3 and the photo transistor Q9 form a light dependent voltage divider that provides an input to the negative terminal of comparator 100. The other input of the comparator 100 is connected to a potentiometer R4. R4 provides the sensitivity adjustment for the sun detection circuit. During daylight hours, transistor Q9 is forward biased and presents a low input to the comparator 100. With a low present at the inverter input and a higher voltage input on the positive input of comparator 100, the output of comparator 100 will provide a high with pull up resistor R1 at the connector J2-4.

The high on the output at connector J2-4 is connected to the input of NAND gate 102 and is coupled through diode CR11 to the other input of NAND gate 102. With both inputs high, the output of the NAND gate 102 is low forward biasing diodes CR1 and CR13. Diode CR1 is connected to the timing generation components capacitor C3 and resistor R5 of timer 104 and therefore clamp this input of timer 102 low disabling the timer 104. When the timer 104 is disabled the input to NAND gate 106 through resistor R34 is high. The output of NAND gate 106 is then low which forward biases diode CR2 disabling timer 110.

The output of timer 110 on line 126 is connected to the signal generation circuit 112. The output on line 126 is high causing the output of 112 to be disabled as a high. One of the outputs of circuitry 112 is connected to NAND gate 114. When circuit 112 is off and the output is high, the output of NAND gate 114 is low and the lamp 116 is not driven. The high output from circuitry 112 also disables transistor Q15 which turns transistor Q15 off enabling the remainder of the coupling circuit.

In operation the coupling circuit receives a slave signal from connector J2-6 through resistor R40 and across the jumper 111 which is wired to receive either a positive or a negative active slave indication signal. When appropriately wired, the jumper block 111 will provide a positive signal on the collector of transistor Q11 which is provided to the base of transistor Q12 through resistor R43 and to capacitor C15. The signal to the base of Q12 is clamped low by diode CR13 when the sunlight detector is detecting sunlight. The positive input through capacitor C15 to NAND gate 108 is combined with the positive output of generator circuit 112 that results in a negative output of NAND gate 108, forward biasing diode CR9 and clamping the output of capacitor C3 disabling the timer 104 as previously explained.

As night approaches and sunlight disappears, the output of comparator 100 becomes low causing the output of NAND gate to become high reverse biasing diodes CR1 and CR13. Therefore, capacitor C3 will charge and the first timer circuit 104 will be activated. This timer times through a delay with a relatively long time constant (typically 30 seconds) and afterwards outputs a low active signal through resistor R34 to the input of NAND gate 106 causing the output of NAND gate 106 to go high reverse biasing diode CR2 and thus activating the second timer 110. The output of timer 110 activates producing a low which activates the signal generation circuit 112. The signal generation circuit 112 outputs a low that activates the output of NAND gate 114 which drives the lamp 116. At the same time the output to the input of NAND gate 102 insures that the activation of the lamp 116 does not cause an erroneous signal from the sun detection circuit. Also, the low output on line 127 will, depending on the placement of the jumper and jumper block 111, produce a negative control signal or a positive control signal as the slave signal output through connector J2-6. The output on line 127 is also connected to NAND gate 108 resulting in the output being high which reverse biases diode CR9. The resulting high input from the coupling circuitry to transistor Q12 generates a second low on NAND gate 114 but does not have any effect since this is redundant to the low on line 127. CR13, however, is reversed biased and it does not effect the circuit function.

When night occurs and the circuit timer 104 does not time out before a slave signal is received through connector J2-6, the incoming signal through J2-6 provides a high to the base of Q12 activating lamp 116 through NAND gate 114. Furthermore, this positive signal is connected through capacitor C15 to NAND gate 108 forward biasing diode CR9 and effectively turning off timer 104. Therefore, the control circuit is in the slave mode and the lamp 116 responds directly to the slave signal through connector J2-6. As long as the slave signal on connector J2-6 is present the timer 104 will be disabled. When the sun detector circuitry senses daylight during this time the output of NAND gate 102 forward biases diode CR13 which disables the lamp driving NAND gate 114. However, when CR13 becomes reversed biased, because of the detection of nightfall, the positive signal from the collector of transistor Q11 is applied to the base of transistor Q12 activating NAND gate 114 and driving the lamp 116.

If the slave signal through connector J2-6 fails, the output through capacitor C15 will become low causing a positive output of NAND gate 108 resulting in timer 104 being activated if the loss of sunlight has been detected by photo transistor Q9. Therefore, the failure of a previous master will result in one of the networked control circuits becoming master since the loss of the slave signal will enable the internal timers of the control circuits and the first control circuit to send out a slave signal through the coupling circuitry will become the new network master. Additionally, a master signal is transmitted through connector J2-5 to indicate that that control circuit is in the master mode.

In this embodiment, timers 104 and 110 are 555 timers of a 556 dual timer integrated circuit. The capacitors C1, C2 and C3 of timer 104 and capacitors C4 and C5 of timer 110 provide the reference time constants. Such a dual timer is an ICM 7556 by Intersil and described in detail in the Intersil July 1979 Data Book herein incorporated by reference.

Figure 5:
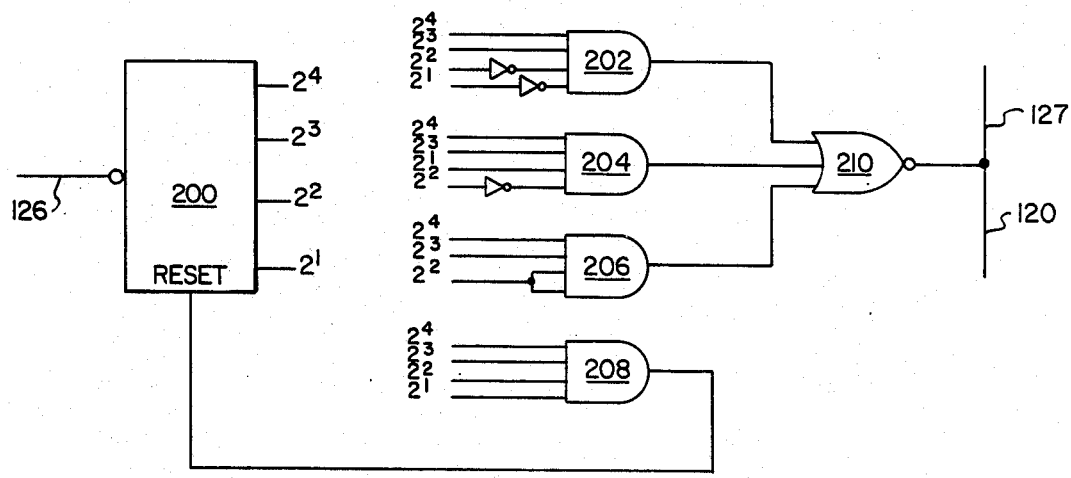
FIG. 5 is a schematic diagram of the code signal generation circuit.

FIG. 5 illustrates the internal combinational circuitry of the signal generation circuit 112 in an embodiment that produces a Morse code letter "u". In this embodiment, the negative active signal on line 126 from timer 110 of FIG. 4 activates the binary counter which provides outputs on the lines marked $2^1$, $2^2$, $2^3$, and $2^4$ which are connected respectively to the NAND gates 202, 204, 206 and 208 as shown. NAND gate 208 provides the reset of the binary counter 200 in order that the sequence may be repeated. The output of NAND gates 202 and 204 provide the two "dots" and the output of NAND gate 206 provides the "dash" of the Morse code letter "u" that is in turn output on line 127 to activate the lamp 116 of FIG. 4.

Although preferred embodiments of the invention have been described in detail, it is understood that various changes, substitutions and alterations can be made therein without departing from the spirit of invention as defined by the appended claims.

What is claimed is:
1. A navigation light control system comprising:
   a network of navigation light control circuits, each navigation light circuit interconnected to all other control circuits of the network and further interconnected to operate at least one navigation lamp, each navigation light control circuit including:
   (a) a first interval timer means for providing a begin signal after a preselected time from initiation;
   (b) a second interval timer means responsive to the begin signal for producing operation period signals;
   (c) a lamp means including a lamp and a lamp driver circuit means, said lamp driver circuit responsive to the operation period signals for flashing the lamp;

(d) a coupling means operatively connected to the network of light control circuits for selectively (1) received a slave operation period signal from one of the other control circuits acting as master for disabling the first and second interval timer means in response thereto and providing operation signals to the lamp driver circuit means, and for (2) transmitting the operation period signals as master from the second interval timer means as slave operation signals to the network responsive to a second interval timer operation signal occurring before the reception of a slave indication signal within a predetermined time from any of the other navigation light control circuits connected to the network.

2. A navigation light control system according to claim 1 wherein said start means for each navigation light control circuit includes a light sensitive detector for providing an initiation signal upon a loss of light below a selected threshold.

3. A navigation light control system according to claim 2 wherein said first interval timer means includes the means for providing the begin signal when a slave indication signal has not been received from one of the other control circuits after a preselected time period.

4. A system according to claim 3 wherein said coupling means further includes jumper means for providing the slave indication signal as either a positive or a negative transmitted signal and for receiving either a positive or a negative slave indication signal from other control circuits.

5. A navigation light control system comprising:

a network of navigation light control circuits, each navigation light circuit interconnected to all other control circuits of the network and further interconnected to operate at least one navigation lamp, each navigation light control circuit including:

(a) start means for producing an initiation signal;

(b) a first interval timer means responsive to the initiation signal for providing a begin signal after a preselected time from initiation;

(c) a second interval timer means responsive to the begin signal for providing an operation period signal;

(d) a code signal generation means responsive to the operation period signal for providing a predetermined sequence of activation signals to a lamp driver circuit means;

(e) a lamp means responsive to the sequence of activation signals for flashing one or more lamps in response thereto; and (f) a coupling means operatively connected to corresponding coupling means of the remaining network light control circuits for selectively (1) receiving a slave indication signal from one of the other control circuits acting as master for disabling the first and second interval timer means in response thereto, and providing said slave indication signal to the lamp driver circuit means as an operation signal, and for (2) transmitting as master the activation slave signals from the code signal generation means to the network when the code signal generation means activation signal has occurred before the reception of a slave indication signal from any of the other navigation light control circuits connected to the network.

6. A system according to claim 5 wherein said code signal generation means further includes combinational logic means for repeatedly providing the predetermined sequence of activation signals to the lamp driver circuit means.

7. A navigation light control system according to claim 6 wherein said start means for each navigation light control circuit includes a light sensitive detector for providing an initiation signal upon a loss of light below a fixed threshold.

8. A navigation light control system according to claim 7 wherein said light sensitive detector includes an adjustable threshold.

9. A navigation light control system according to claim 8 wherein the first interval timer means includes the means for producing the begin signal when a slave indication signal has not been received from one of the other control circuits after a preselected time.

10. A system according to claim 9 wherein the coupling means further includes a jumper means for providing the slave indication signal as either a positive or a negative transmitted signal and for receiving either a positive or negative slave indication signal from the other control circuits.

11. A navigation light control system comprising:

(a) a plurality of spaced navigation lights for indicating navigation hazards;

(b) a corresponding plurality of light control circuits, each control circuit including light sensitive ON/OFF switching circuit means for connection to a source of power, light operational control circuit means responsive to the power output of the light sensitive switch for controlling light operation, and a master/slave operational selector circuit operatively connected to the light sensitive switch and light operational control circuit means for selectively outputting as master and receiving as slave slave operational signals; and (c) electrical connecting means interconnecting the spaced navigational light's master/slave operational selector circuits, whereby the light sensitive ON/OFF switch of the plurality of spaced navigation lights first turned on in response to a selected light intensity threshold provides power to the light operational control circuit means which outputs operational signals to the remaining plurality of navigation lights to inactivate their light operational control circuit means and activate the plurality of spaced navigation lights directly in response to the light operational signals produced by the first turned on navigation light thereby providing simultaneous operation of the spaced navigation lights.

* * * * *